Feb. 2, 1943.   H. L. COOKE   2,309,752
METHOD AND APPARATUS FOR PRODUCING MAPS
Filed April 6, 1940   4 Sheets-Sheet 1

INVENTOR
H. L. COOKE
BY Moses + Nolte
ATTORNEYS

Feb. 2, 1943.  H. L. COOKE  2,309,752
METHOD AND APPARATUS FOR PRODUCING MAPS
Filed April 6, 1940   4 Sheets-Sheet 2

INVENTOR
H. L. COOKE
BY
Moses + Nolte
ATTORNEYS

Feb. 2, 1943. H. L. COOKE 2,309,752
METHOD AND APPARATUS FOR PRODUCING MAPS
Filed April 6, 1940 4 Sheets-Sheet 3

INVENTOR
H. L. COOKE
BY Moses + Nolte
ATTORNEYS

Feb. 2, 1943. H. L. COOKE 2,309,752
METHOD AND APPARATUS FOR PRODUCING MAPS
Filed April 6, 1940 4 Sheets-Sheet 4

INVENTOR
H. L. COOKE
BY
Moses & Nolte
ATTORNEY

Patented Feb. 2, 1943

2,309,752

UNITED STATES PATENT OFFICE 2,309,752

METHOD AND APPARATUS FOR PRODUCING MAPS

Hereward Lester Cooke, Princeton, N. J., assignor to Aero Survey Corporation, a corporation of Delaware Application April 6, 1940, Serial No. 328,175

24 Claims. (Cl. 88—24)

The object of this invention is to provide methods and means for producing maps of a greatly improved type in which substantially all available photographic and topographical information relative to terrain depicted is shown clearly on a flat surface in precise planimetric relation corresponding to that of nature. For the sake of brevity maps of this type will be referred to as "phototopes."

Maps as produced by known methods are similar in kind, though superior in accuracy and completeness, to the maps of ancient times. No fundamental improvement in principle has been introduced. Amongst the shortcomings of existing maps may be mentioned the difficulty of locating one's position when on the ground without the aid of surveying instruments, by means of even the best of topographical maps, and the difficulty of forming a mental picture of the visual character of terrain represented by such maps. These difficulties are avoided in the type of map herein described.

Previous attempts to produce maps combined with photographic representations of the terrain have been confined to methods of grossly inaccurate approximation, which even in the case of substantially level terrain yield results of doubtful usefulness and questionable accuracy, but which, applied to terrain of marked variation of level, show obvious and gross distortions of the information intended to be conveyed. In contrast with these previous attempts to accomplish the results herein described the methods and means set forth in this specification are based on exact solutions of the underlying geometrical problems so that the photographic detail in the resulting map is located with the same planimetric accuracy as the topography itself.

Phototopes have outstanding advantages for military uses as well as for peacetime purposes. As the time element is of critical importance in producing military maps under conditions of active warfare it is essential to reduce to a minimum the time and labor expended on their production. The present invention is concerned with phototopes and methods of producing the same and particularly with methods of reducing the time and labor involved in the production of phototopes.

In general the improved method contemplates the preparation of an accurate model of the terrain preferably in the manner described in my United States Patent No. 1,980,981. This patent describes methods and apparatus for producing carved three dimensional models of terrain by means of pairs of overlapping photographs taken from aircraft, such photographs, or rectified or horizontalized projections thereof, being placed in projection apparatus and simultaneously projected upon a block of carvable material in such adjustment as to produce a visual, or "plastic" image thereon. The block is then carved to coincide with this plastic image so that it constitutes a true three dimensional model of the terrain. As set forth in said patent such model may be made of the same vertical scale as horizontal scale, or of a different vertical scale (preferably increased) with respect to the horizontal scale. A matching aerial photograph of the terrain is then projected upon the surface of the model. Preferably this is done without disturbing the adjustment of the projectors and with the model occupying the position with respect to such projectors which it occupied while being carved to fit the plastic image, one or both of the photographs used in forming the plastic image being projected upon the surface of the model. If, as described in my patent aforesaid, rectified photographs are used to produce the plastic image, in conformity with which the model is carved, then one or both of such rectified photographs will be projected upon the model surface, whereas if the model is carved by means of unrectified photographs, then such unrectified photographs will be projected upon the model. In either event the projection center corresponds with the position of the camera with respect to the terrain at the time the original photograph was taken so that exact registry between the projected photograph and the surface of the carved model is secured. Exact three dimensional and visual correspondence between the surface of the model with the photographic representation thereon and the actual form and appearance of the terrain in nature is thus secured.

If desired, the photographic projection may be permanently recorded on the surface of the model as described in my patent aforesaid, by sensitizing the surface of the model, making the projection thereon, and developing such sensitized surface, and the model with the photographic image recorded thereon thus used in carrying out the subsequent steps of the process. Preferably, however, because of the increased speed and simplicity, the model with the photographic image temporarily optically projected upon its surface in registry therewith, is used in the subsequent steps of the process. In either case the next step in the process consists in taking a photograph of the model with the photographic projection temporarily or permanently thereon, such photograph being taken by a suitable optical system whereby the effects of perspective are substantially eliminated. In other words this photograph constitutes an orthogonal projection of the model upon a plane surface. In preparing a phototope, the photograph is taken from a position corresponding to a point on a vertical axis through the terrain depicted, preferably the central vertical axis. The resultant photograph is a photograph of the terrain substantially free from distortion and capable of being used for direct measurement of objects appearing therein so as to enable distances and directions to be immediately ascertained. Such a photograph may also be exactly matched with similar photographs of adjoining terrain so as to produce an accurate mosaic which is correct in planimetry throughout. This result has never before been achieved and such a corrected photograph or mosaic is in itself a product of great utility and value.

The making of the orthogonal or substantially orthogonal photograph of the model may be accomplished by taking a long focus or telephoto photograph of the model from a relatively great distance, as hereinafter more particularly described, or by the use of any other equivalent optical system. Such methods of photographing the model use only rays coming to the camera lens which leave the model in a direction normal to the datum plane of the model, or so nearly normal thereto as not to be distinguishable in their photographic effect from normal rays. Such rays are obviously substantially parallel and therefore the resulting photograph is for practical purposes free from distortion due to parallax. As the making of the photograph of the model can be performed under controlled or laboratory conditions, the photograph can be made at such scale as to preserve all of the photographic detail appearing in the original airplane photograph projected on the surface of the model. The result is a photograph having the detail of the original airplane photograph but with the distortions inevitably present in the original airplane photograph eliminated, or reduced to an extent unobtainable by direct photography of the terrain.

It is a further feature of the invention to combine such a true photographic representation of the terrain with all conventional map indicia, so that a combined map and photograph, or phototope, is produced. Contour lines are preferably indicated in the phototope. This may be accomplished by drawing the contour lines in any suitable manner, as for instance by the methods ordinarily employed in the use of the Multiplex apparatus. However, the contour lines may be more quickly and correctly located by proceeding in accordance with the methods set forth in United States patent application, Serial No. 214,208, filed June 17, 1938. In accordance with the procedure set forth in said application the model of the terrain is carved from a block of material having laminations therein accurately located to correspond to the desired contour intervals. When the relief is carved in such laminated block the edges of the laminations appear as contour lines. By projecting the original photograph of the terrain upon such a carved block and photographing the same in the manner described, a photograph or phototope is produced in which the terrain is photographically illustrated and in which the contour lines also appear. Various procedures may be employed to bring out the contour lines to the best advantage and to combine the showing of the contours and other map indicia in conjunction with the photograph of the terrain in true planimetry. These may be modified to suit particular conditions and the specific procedures described hereinafter are to be regarded as examples of preferred methods to which the invention in its broader aspects is not necessarily limited.

The invention also contemplates the use of an accurate model of the terrain with the photographic representation of the terrain projected thereon, as referred to above, for the preparation of pictures or maps of the terrain as viewed from any position other than the positions occupied by the cameras from which the terrain was originally photographed. If the model is rephotographed from a vertical position at great optical distance from the model, a planimetrically corrected photograph is produced, as referring to above. However, the model with photograph projected thereon may be photographed from any oblique position desired (within the limits of the apparatus), and a true oblique picture of the terrain is thereby secured, as the same would appear from the corresponding position in nature. Such oblique photographs are of great value in the study of the country as for the location of engineering works, or for military purposes. If the model is provided with grid or contour lines, or other indicia, the resulting oblique photograph will show the same, and enable positions in the photograph to be accurately determined with reference to the grid and contour lines.

In the accompanying drawings, which form a part of this specification.

Figure 1:
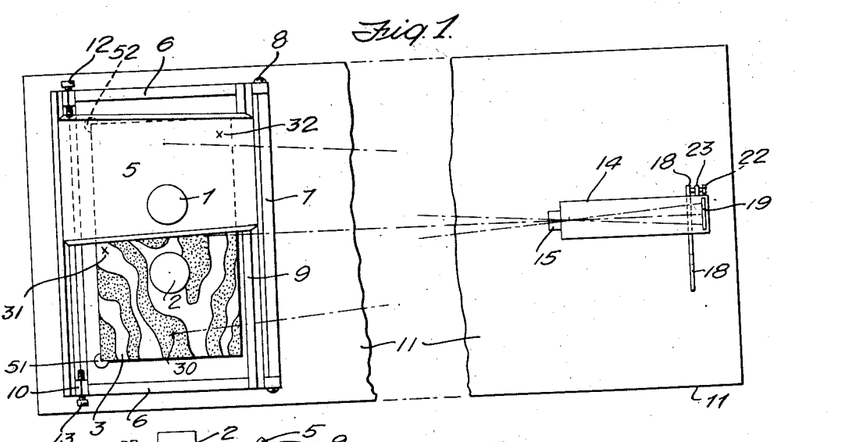
Figures 1, 2 and 3 are respectively a plan, a side elevation and an end elevation of one form of apparatus which may be employed, shown diagrammatically.
Figures 2, 3, 4, 5, 6:
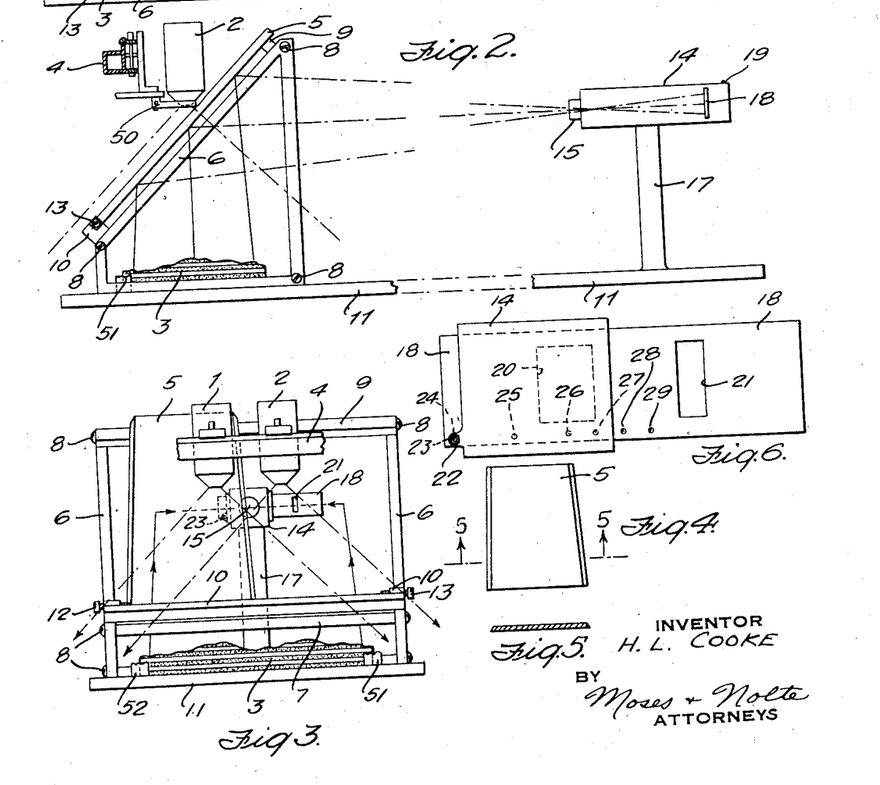
Figures 4 and 5 are plan and cross section respectively of a mirror shown also in Figures 1, 2 and 3.
Figure 6 is an end elevation of the camera shown in Figures 1, 2 and 3.

Referring now to the drawings, more specifically Figs. 1, 2 and 3, 1 and 2 are two projectors of the well known Multiplex type, arranged to cast a plastic image on the laminated block 3, here shown as carved to fit the plastic image, as described in my United States Patent No. 1,980,981. As explained in said patent, the vertical scale of the plastic image and model may be the same as the horizontal scale, or, if rectified or horizontalized projections of the photographs are used, may be increased or diminished with respect to the horizontal scale, it being usually increased. The supports, together with the usual control mechanism are slidably suspended on the main horizontal rod 4 of the stand carrying the projectors.

Figure 7:
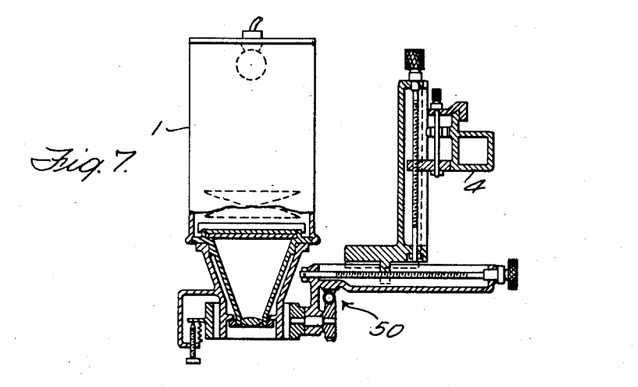
Figure 7 is a side elevation, partly in section, of one of the projectors shown in Figures 1, 2 and 3.
Figure 8:
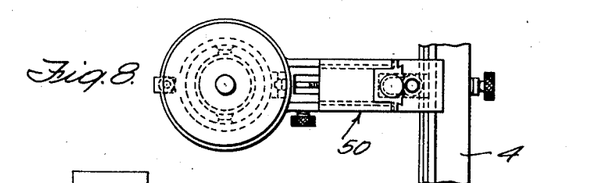
Figure 8 is a plan view of the same.

In the Multiplex type of apparatus the projectors are supported on the horizontal rod 4 by supporting means 50 permitting of their universal adjustability with respect to the rod, as shown for instance in United States patent to Bauersfeld, No. 1,980,657, and more particularly illustrated in Figs. 7 and 8. The construction of the supporting means 50 shown in Figs. 7 and 8 is the same as that described in the Bauersfeld patent and need not, therefore, be described in detail herein.

By projecting one or both of the photographs contained in the respective projectors upon the carved surface of the block it will be seen that the block which is a true model of the terrain, for the time being has a projected photographic image of the terrain appearing on its surface in accurate registry therewith. The apparatus next to be described comprises a convenient optical arrangement which may be utilized for taking a photograph from a long distance of said carved model and projected photographic image so as to secure an orthogonal photograph thereof. Any suitable arrangement of apparatus other than that specifically set forth may be utilized to accomplish this photographic operation.

The front silvered mirror 5 rests on a support consisting of end frames 6 and connecting rods 7, secured to the end frames 6 by screws 8. Top and bottom rails 9 and 10, with which the mirror is in contact, are arranged so that the plane of the silvered surface of the mirror is at 45°, or other suitable angle, to the horizontal table surface 11, on which the apparatus rests. The mirror support is so placed that the top of the mirror 5 is on the side of the projectors 1 and 2 towards the camera 14, hereinafter described. The mirror support is so oriented on the surface 11 that the line of intersection of any horizontal plane with the silvered surface of the mirror is parallel to the rod 4. Let the vertical plane, normal to the rod 4 and midway between the lenses of the projectors 1 and 2 be designated the vertical axial plane. The mirror 5 may be slid horizontally on the rails 9 and 10, the limits of its horizontal motion being determined by adjustable stops 12 and 13 so arranged that when the mirror 5 is in contact with the stop 12, as shown in Figs. 1 and 3, the right hand edge of its silvered surface (Figs. 1 and 2) looking towards the camera 14 lies slightly to the right of the vertical axial plane; and when the mirror 5 is in contact with the stop 13 the left edge of its silvered surface, Figs. 1 and 2, is slightly to the left of the vertical axial plane. The amount by which the silvered surface of the mirror 5 should overlap the vertical axial plane in the two positions specified above is such that the image, reflected in the mirror 5, of all points on the block 3 lying in the vertical axial plane should be visible from every portion of the aperture of the lens 15 of the camera 14 hereinafter described. The mirror 5 (Fig. 4) is preferably not made rectangular but with the top and bottom edges parallel and the two corners in contact with the rail 10 made less than 90° by an angle $\phi$ such that $\tan \phi = 2L \cos \theta/D$, where L is the length of the optical path of rays from the block 3 reflected by the mirror 5 to the lens 15, $\theta$ is the angle between the plane of the mirror 5 and the horizontal, and D the diameter of the aperture of the lens 15. The angle is small and in most instances this factor may be disregarded and a rectangular mirror used. The mirror 5 is preferably bevelled slightly on its non-parallel sides away from its reflecting surface 16 as shown in Fig. 5. The camera 14, with a long focus or telephoto lens 15, is supported firmly by the member 17 with its axis horizontal and in the vertical axial plane. It is preferably so placed that the length of the optical path from the surface of the block 3 to the lens 15 is great.

Turning now to Fig. 6, the camera 14 is fitted with a thin opaque slide 18 arranged a short distance in front of the plate 19. The slide 18 has a rectangular opening 20, as shown, which is one-half of the width of the exposure to be recorded on the plate 19. A detent pin or screw 22, (Fig. 1) operating in the fixed support 23 is arranged to engage with holes 24 and 25 in the slide 18. When the detent pin 22 is in the hole 24 light passing through the lens 15 and the rectangular opening 20 will expose one-half of the plate 19 and when said detent pin engages with the hole 25 the other half of the plate will be similarly exposed, the distance between the holes 24 and 25 being exactly equal to the width of the rectangular opening 20.

With the construction described it will be seen that the entire model may be photographed upon the plate 19 in two exposures, one-half of the plate being exposed through the opening in the slide 18 when the slide is in its right hand position and the mirror 5 in its left hand position, and the other half of the plate being exposed when the slide is in its left hand position and the mirror 5 in its right hand position. In some instances, owing to the position of the projectors 1 and 2 it may be desirable to expose the plate 19 one-quarter at a time, instead of one-half at a time. For this purpose the slide 18 may be provided with a second opening 21, one-quarter of the width of the exposure to be recorded on the plate 19. In such event the slide is provided with additional holes 26, 27, 28 and 29, the distance between adjacent holes in this series being equal to the width of the opening 21 and permitting four successive contiguous exposures of adjacent quarters of the plate to be made.

Figure 10:
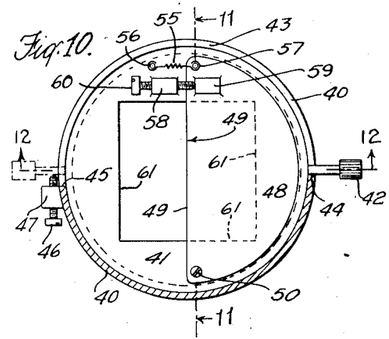
Figure 10 is a cross section of a modified form of long distance photographic camera taken on line 10—10 of Figure 11.
Figure 11:
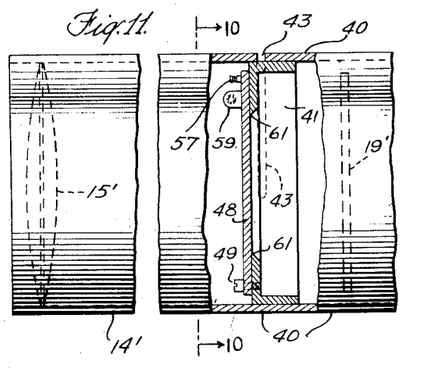
Figure 11 is a diagrammatic side elevation of such camera, partly in longitudinal section.
Figure 12:
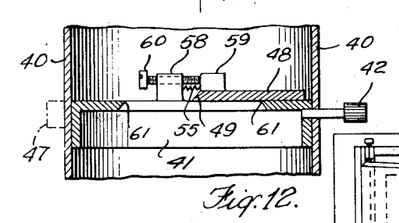
Figure 12 is a view in longitudinal section taken on line 12—12 of Figure 10.

In place of the slide 18 a rotating screen, internal to the body of the camera may be employed, this arrangement being preferred. A rotating screen of this type is shown in Figs. 10, 11 and 12. Within the tubular body 40 of the camera 14' the member 41, having a rectangular opening 61, is mounted for rotation about the axis of the tubular body 40 which is also the axis of the camera lens. The angular position of the member 41 is controlled by the projecting member 42, passing through the slot 43, which extends from the point 44 over and across to the point 45, Fig. 10. The angular motion of the member 41 in counterclockwise direction, Fig. 10, is limited by contact of the projecting member 42 with the adjusting screw 46 passing through the block 47 which is rigidly attached to the tubular body 40. The screw 46 is so adjusted that when the projecting member 42 moves from contact with the end 44 of the slot 43 over to contact with the screw 46 the member 41 turns through precisely 180°.

The member 41 carries the semicircular plate 48 having a beveled straight edge 49. The plate 48 is rotatably mounted on the member 41 by means of the pivot 50. A spring 55, under tension, is attached to the pins 56 and 57 rigidly attached to the respective members 41 and 48. Blocks 58 and 59, are rigidly attached to the respective members 41 and 48. An adjusting screw 60, passing through the block 58 has its point maintained in contact with the block 59 by means of the tension in the spring 55. The screw 60 is so adjusted that the axis of rotation of the member 41 passes through the straight edge 49; in other words the line of the straight edge 49 when the member 42 is in contact with the end 44 of the slot 43 is identical with its position when the member 42 rests against the screw 46.

It will be seen that the function of the members 41 and 48, with associated mechanism, is to expose alternately the two halves of the plate 19' of the camera 14'. This arrangement thus serves the same function as shifting the sliding plate 18, Fig. 4, in which the rectangular opening 20 occupies its two alternative positions corresponding to successive exposures of the two halves of the plate 19. It does not however duplicate the function of the smaller opening 21 in the plate 18. This however does not constitute a disadvantage as with a proper design of the Multiplex projectors the mirror 5 can be placed so close to the lens of one projector that the entire carved block will be illuminated by the projector not over the mirror. Thus each half of the photograph may be secured by a single exposure completely covering the half of the block under the mirror.

Figure 13:
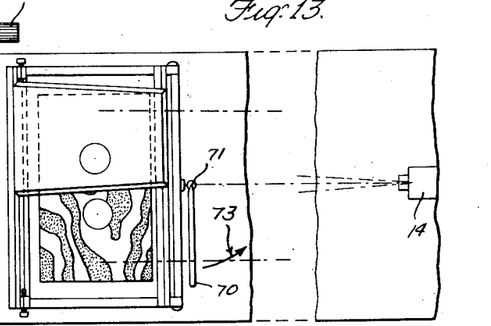
Figure 13 is a plan view similar to Fig. 1 showing the model and mirror mounted thereover and showing a shutter arrangement for permitting a one-half image to be photographed.
Figure 14:
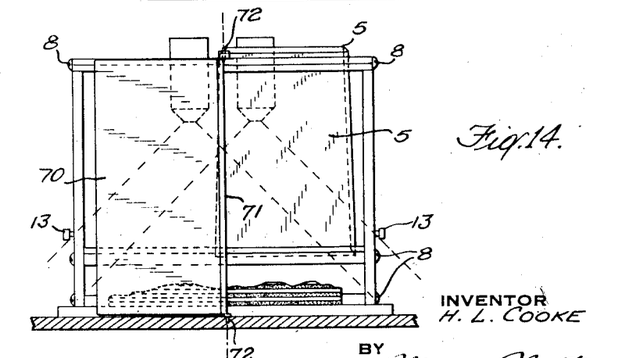
Figure 14 is a view of the parts shown in Figure 13 looking at the same from the direction of the camera.

A third method of effecting exposure of the two halves of the plate in succession is shown in Figs. 13 and 14. In this construction a dead black plate 70 is mounted for rotation about a central vertical axis, in front of the mirror holder in the position shown. The vertical, doubly beveled straight edge 71 of the plate 70 coincides with the vertical axis of rotation 72 of the plate. It will be seen that as the plate 70 is swung about its vertical axis 72 as indicated by the arrow 73 the half of the mirror holder which is not occupied by the mirror 5 will be obscured by the plate 70, so that only that half of the photographic plate 19 on which the image of the half of the block 3 which is transmitted by the mirror 5 will be exposed. This arrangement thus serves a function analogous to that of the slide 18, Figure 6, and to that of the plate 48, Figures 10, 11 and 12. This arrangement has the advantage of less demands for accuracy of construction and adjustment than the method involving the use of the slide 18 or that employing the rotating plate 48, and further permits the camera employed in photographing the block to be changed. Its principal disadvantage is that it is difficult to blacken the surface of the plate 70, which is necessarily exposed to the light in the room, so effectively as to prevent photographic action of that part of the photographic plate 19 which is meant to be obscured. Therefore the arrangement shown in Figures 10, 11 and 12 represents the preferred method.

The method of using the apparatus will now be described. Two overlapping diapositive photographs of terrain to be mapped are mounted in the projectors 1 and 2 and the projectors are then brought into mutual relation whereby a correctly placed, oriented and scaled plastic image of ground common to the two photographs may be viewed anaglyphically, the procedure in accomplishing this result being identical in all respects with the normal procedure when adjusting the Multiplex apparatus. If the usual red and blue filters and spectacles are employed in viewing the plastic image, the block 3, which is to be carved, should preferably be made of alternate colored layers capable of differentiation when photographed. It will be understood, of course, that a block without laminations may be used if desired, although the use of the laminated block possesses great advantages where contour lines are to be recorded.

This block 3 is first placed beneath the projectors 1 and 2, in contact with registration stops 51 and 52 and carved to fit the plastic image, as described in U. S. Patent No. 1,980,981.

Three registration marks, 30, 31 and 32 such as small crosses or circles, are now made on the surface of the carved block 3 at the corners of as large a triangle as the block will conveniently accommodate. The original block, carved as above described, is preferably used in the subsequent steps of the process to be described, but it will be understood that a reproduction of the block produced by moulding or in any other suitable manner may be used in place of the original block.

The mirror 5 and its support are then placed in position as hereinbefore specified. Clear uncolored glasses are now substituted for the red and blue filters in the projectors 1 and 2 and a colored filter if desirable is placed in front of the lens 15 of the distant camera 14. If a plain block instead of a laminated block is used, or a block with black (or gray) and white layers, the filter would be omitted. The color of the filter used would naturally depend upon the color of the laminations, yellow for instance being appropriate for use with light blue laminations. The lights in both projectors 1 and 2 are then turned on and two consecutive full time exposures are made on the same plate 19 in the camera 14. In these exposures the mirror 5 and opening 20 in the slide 18 are on opposite sides of the vertical axial plane, the mirror 5 being against the stop 12 and the dentent pin 22 engaging with the hole 24 for the first exposure (figures being taken as looking at the camera 14 from the rear, with the opening 20 to the right), and in the second exposure the mirror 5 being against the stop 13 and the detent pin 22 in the hole 25. If the forms of apparatus shown in Figs. 10, 11, 12, 13 and 14 are used the corresponding adjustments will be made to make the exposures of the two halves of the plate, as is obvious from the description of such apparatus already given. The resulting photograph, developed as a negative, which will be referred to as the corrected contoured negative, shows the three registration marks on the block 3 and all the photographic detail of the diapositives used in the projectors 1 and 2, in planimetric relationship accurate within limits determined only by the optical distance of the surface of the block 3 from the lens of the camera 14, the errors in planimetry, due to parallax, varying inversely with this distance. For instance if the optical path from block to camera is made to correspond to 100 miles on the scale of the plastic image (approximately 60 feet in normal practice) the resulting photograph will be identical in so far as the elimination of distortion due to parallax is concerned with a photograph of the same area taken from a height of 100 miles with the axis of the camera accurately vertical. Under these conditions errors due to parallax are so small that they may be entirely disregarded and a photograph correct in planimetry for all practical purposes is secured. At the same time the photograph may be made at such a scale as to reproduce all or substantially all of the photographic detail of the original airplane photograph taken at usual flying heights. In this respect the photograph of the model will differ essentially from any hypothetical photograph of terrain taken from 100 miles in the air. The corrected contoured negative will show darker and lighter zones running through it corresponding respectively to the exposed surfaces of the different layers on the surface of the carved block, indicating definite contour zones or lines, whose relative height above sea level is determined by the thickness of the individual layers of the block, the scale of the craving and the adjustment of the apparatus, all of which are known. The object of having the layers of the block 3 alternately colored and white rather than pale gray and white or black and white is that this enables a corrected but uncontoured photograph of the picture projected on the block, if desired, to be made with the camera 14 by substituting for instance a blue filter for the yellow filter in the said camera and then proceeding as described above.

Instead of having the block 3 made of alternate layers of white and colored layers it may be made of layers of white material separated by thin films of black, gray or colored material, so that contour lines, not zones, will appear on the block when carved. Or all the layers may be made of normally white material, alternate layers being impregnated with a chemical indicator, such as phenolphthalein, whereby the lines or zones may be made to appear or disappear at will, by being subjected to alkaline or acid solutions.

The corrected contoured negative is now placed emulsion side down in a projection camera 33 (Figure 9) mounted rigidly above a table 34 and an image of said negative is projected on the drawing paper 35, the height of the camera 33 above the paper 35 being adjusted to give a scale of projected image suitable for the purpose in view. The topography of the area depicted is then drawn in ink on the paper 35, showing the grid (located by the known control points of the photograph) roads, names, etc.—in fact all the topography to be represented, including indicia for all essential objects not clearly defined in the negative. The location of all topographic detail may be ascertained by direct inspection of the negative image on the paper 35 or in the case of indistinctness or ambiguity by inspecting the plastic image produced by the projectors 1 and 2 on the carved block 3. Finally the positions of the images of the three registration marks, 30, 31 and 32 on the block 3 are marked in ink on the paper 35.

Figure 9:
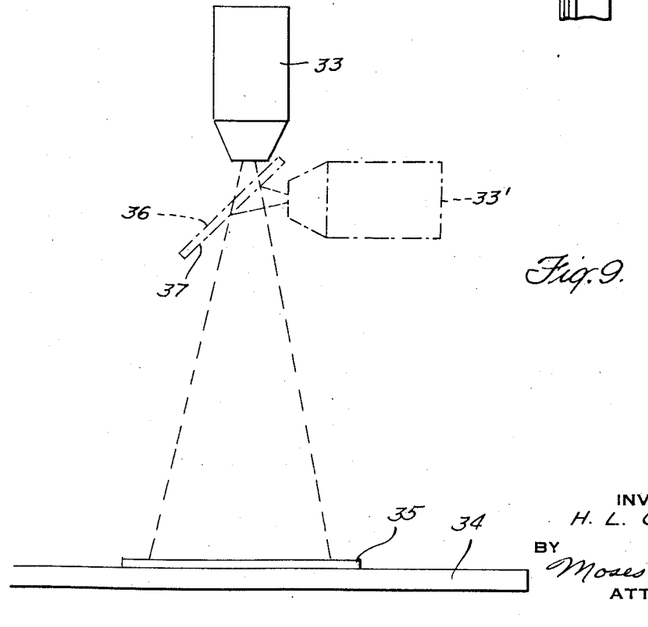
Figure 9 is a diagrammatic side elevation of a projection camera and drawing table.

The corrected contoured negative is now removed from the camera 33, and an unexposed photographic plate substituted in its place, emulsion side down. This plate is then exposed and developed as a negative. A contact print of this negative is then made on a second plate with the emulsion surfaces of the two plates in contact. This second plate when developed in the ordinary way is a diapositive of the topographic drawing on the paper 35 showing dark lines on a clear background. This plate will be referred to as the topographic positive.

If preferred the topographic positive may be prepared directly by a single step from the drawing on the sheet 35 by placing a front silvered mirror 36, with its silvered side 37 down, at 45° to the horizontal, as shown in dotted lines in Figure 9, and swinging the camera 33 to the position 33', the image of its original position with reference to the reflecting surface 37. A plate placed in the camera while in the position 33' will upon positive development be a topographic positive identical with one produced by the first method described above. The second method is preferable for peace time surveying but the former is better adapted for conditions of warfare on account of the greater simplicity of equipment.

The corrected contoured negative and the topographic positive are now fastened together, face to face, with the emulsion coated surfaces in contact and the images of the three registration marks in alignment. When a normal projected image of the two plates, united in this way, is photographed and subjected to normal development the result will be a phototope of the desired kind. This phototope constitutes the end product of the process hereinbefore described.

This phototope will show all the photographic detail of the diapositives used in the projectors 1 and 2, the contour zones developed by carving on the surface of the block 3 and all the topography drawn on the sheet 35, everything shown being in planimetric relationship correct to within limits determined solely by the practical limit of the optical distance from the block 3 to the lens 15 of the camera 14. Such phototopes represent accurately all the information derivable from the photographs and triangulation on the basis of which they are prepared. In the amount and accessibility of information contained they are superior to all types of maps known at the present time. Their advantages are equally outstanding for civil and military purposes.

The piecing together of vertical planimetrically corrected phototopes of the character above described to form a connected mosaic of an extended area with photographic and topographic information in correct mutual registration may be readily carried out by known methods. Such planimetrically corrected mosaics are superior to mosaics prepared as at present from planimetrically uncorrected views, because the sections of the corrected mosaics can be accurately matched, no doctoring or shifting of the photographic details adjacent to the lines of separation of the individual component views being necessary, as with the uncorrected photographs.

Figure 15:
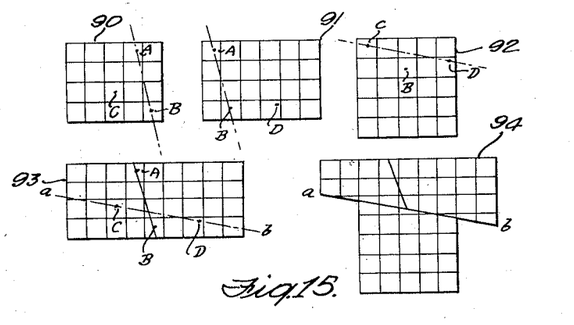
Figure 15 is a diagram showing how planimetrically corrected mosaics may be prepared from phototopes made in accordance with the present invention.

An example of the process of forming mosaics is shown in Fig. 15 in which the three planimetrically corrected phototopes 90, 91 and 92 are to be joined to form a connected mosaic. Objects A, B and C are identifiable on view 90, objects A, B and D on view 91 and objects C, D on view 92. 90, 91 are each cut along straight lines passing through A, B, and joined, forming the two-element mosaic 93. 92, 93 are then each cut along the line connecting C, D, and joined, forming the three-element mosaic 94; and the process is continued in this manner until the entire mosaic is completed. The completed mosaic will then have all the characteristics and advantages of a single phototope of the area shown, all objects and topography being shown in correct planimetric relation, a result not previously accomplished by any known method.

Figure 16:
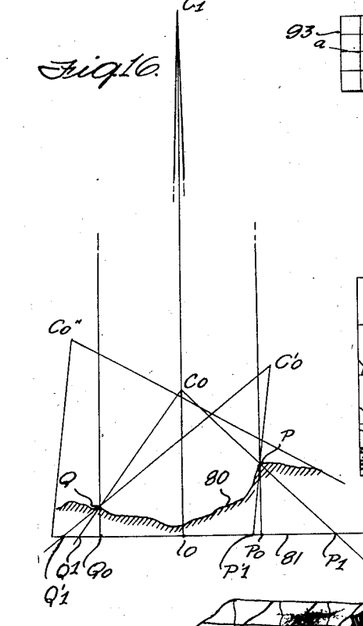
Figure 16 is a diagram showing how errors under present practice are corrected by this invention.

The reduction in the planimetric error effected by photographing the model from a considerable distance may be understood clearly by reference to Fig. 16. 80 represents a section of terrain photographed from an aeroplane at $C_0$. It is required to produce on the map plane 81 orthogonal projections such as $P_0$, $Q_0$ of corresponding points such as P, Q, on the surface of the terrain. The errors in planimetry of P, Q on the aeroplane photograph taken from $C_0$ are respectively $P_0P_1$ and $Q_0Q_1$, since the photographic projections of P and Q lie at $P_1$ and $Q_1$. If a second overlapping photograph is taken from an aeroplane at $C'_0$ the projections of P, Q lie at $P'_1$ and $Q'_1$, respectively. Thus the attempt to join together the projections from $C_0$ and $C'_0$ to form a connected mosaic of the terrain will result in a lack of agreement of the two pictures where they join in addition to the planimetric errors such as $P_0P_1$, $Q_0Q_1$, $P'_0P'_1$, $Q_0Q'_1$ within the photographs themselves. The errors in existing methods of producing mosaics are brought about in this way, since the mosaics are formed by the process here indicated. The terrain depicted in Fig. 16 is made extremely irregular in order to bring out clearly the geometry of the problem. If, following the process described in this specification, a carved model of the terrain 80 is produced, a projected image of one of the photographs, say that taken from $C_0$, then cast on the carved model in correct registration, and the model with superimposed image then photographed from a distant point such as the image formed by the mirror 5 of a point $C_1$, vertically above any chosen point on the terrain depicted, the planimetric errors on the resulting photograph of the positions P, Q will be reduced to such a degree as to be unobservable and to disappear for purposes of practical photography.

Such corrected photographs are themselves useful as explained above, and are useful for the production of phototopes as explained. They can also be joined together to make correct photographic mosaics, a result which is not obtainable by existing methods, and such correct mosaics are in themselves a novel product of great utility.

The uses to which the combination of a carved model of terrain and a photograph showing any portion of said terrain may be adapted are numerous and varied in character. As an instance, suppose that the terrain depicted in Fig. 16 has been carved to the form 80, as shown. And suppose now that a diapositive of a photograph such as that taken from $C'_0$ is placed in projection apparatus of the Multiplex type and the projected image of said diapositive brought into correct registration with the carved surface 80, as may be done with normal manipulation of the Multiplex apparatus by bringing three or more identifiable images on the projection into registration with corresponding identifiable positions on the block. A photograph of the carved block with superimposed image may now be taken from any chosen position such as $C''_0$, either with or without the use of a suitably placed interposed mirror such as 5, according to whether the view of the block from the position $C''_0$ is or is not obstructed by the projector in which the diapositive is placed. It is obvious that this procedure enables any aeroplane photograph of the terrain, taken from any point whatever, regardless of height, position or inclination of camera axis to the vertical to be transformed into the photograph which would be obtained from any other position whatsoever, with the sole limitations that the necessary obliquity of the axis of the projection apparatus casting the image of the diapositive on the carved model is not greater than that which the mounting of said projection apparatus is adapted to accommodate, and that all objects to be depicted are visible from both positions $C'_0$ and $C''_0$. The transformation of projections of the terrain from the position $C_0$, $C'_0$ into the projection from the position $C_1$ explained hereinbefore, is thus merely a particular case, though an exceedingly important case from the cartographer's point of view, of the more general process as described.

Figure 17:
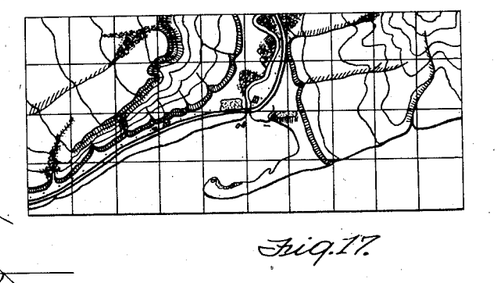
Figure 17 is a photographic projection taken from the position $C_1$ of the model shown in Figure 16 with the photograph of the terrain projected thereon from the point $C_0$.
Figure 18:
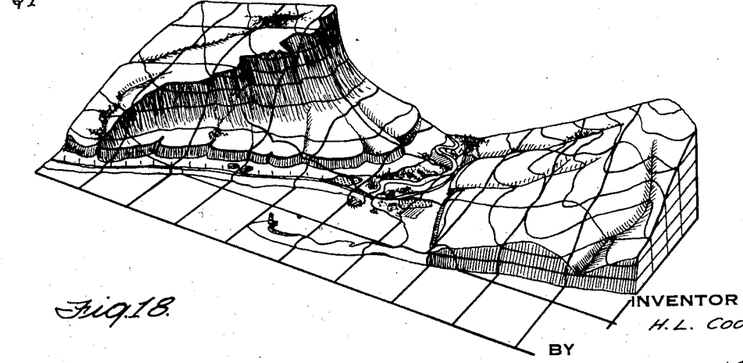
Figure 18 is a similar photographic projection taken from the position $C''_0$ in Figure 16.

It should be noted that in taking a photograph of the carved block with superimposed image from any point, such as $C''_0$, Fig. 16, the block may be of layered construction with the contour lines or zones visible photographically, and may also show grid lines on its surface, as explained in U. S. patent application, Serial No. 214,208 above referred to. The resulting photograph will be of the type shown in Fig. 18, here shown as an oblique view. This displays a combination of topographic and photographic information in correct relative configuration as viewed obliquely, so that the position and height of all identifiable objects may be read off directly from an oblique photograph, a result heretofore not accomplished. Although an oblique view of the country, it is capable of supplying quantitatively all or most of the information derivable from a vertical phototope such as one taken from the point $C_1$, Fig. 17, the main difference between the projections from $C_1$ and $C''_0$ being that angles and distances between objects may be read off and measured directly from the projection taken from $C_1$, whereas the corresponding information is derivable from the $C''_0$ projection only by computation based on the coordinates of the objects as read off from the oblique view. The projection from $C_1$ is thus a more useful instrument for quantitative information, but the oblique view gives a much more realistic impression of the character of the terrain than the vertical planimetrically corrected view. Thus each type of projection, corrected vertical and oblique, has characteristic advantages.

The planimetrically corrected photograph, phototope, mosaic and oblique or perspective photograph, constituting the novel products of the processes herein described, are not claimed in this application, as they form the subject-matter of a divisional application filed by me June 22, 1942, Serial No. 447,897.

I claim:

1. The method of preparing a photographic plan of terrain which consists in preparing a scale relief model of the terrain, projecting a photograph of said terrain, on said model in accurate registry therewith, the projection center corresponding with the position of the camera with respect to the terrain at the time the photograph was taken, taking a long distance photograph of said model with the photograph projected thereon, with camera axis effectively normal to the datum plane of said model, and producing a print of said photograph with grid lines thereon in predetermined position and in accurate registry with the planimetry of the physical features shown in the photograph, whereby a photographic plan is produced in which the location of objects represented in the photograph may be accurately determined with reference to said grid lines.

2. The method of preparing a photographic map of terrain which consists in preparing a scale relief model of the terrain, projecting a photograph of said terrain, on said model in accurate registry therewith, the projection center corresponding with the position of the camera with respect to the terrain at the time the photograph was taken, taking a photograph of said model with the photograph projected thereon, with camera axis effectively normal to the datum plane of said model using only rays coming to the camera lens which leave the model in a direction normal to the datum plane of said model, or so nearly normal thereto as not to be distinguishable in their photographic effect from normal rays, preparing a projection having grid lines and map indicia thereon corresponding to the terrain to be mapped, and printing said photograph in registry with the map indicia and grid lines of said projection whereby a photographic map is produced comprising a photograph of the terrain together with map indicia and grid lines in substantial registry therewith.

3. The method of preparing a phototope of terrain which consists in preparing a scale relief model of the terrain, projecting a photograph of said terrain on said model in accurate registry therewith, the projection center corresponding with the position of the camera with respect to the terrain at the time the photograph was taken, taking a long distance photograph of said model with the photograph projected thereon, with camera axis effectively normal to the datum plane of said model, preparing a projection having grid lines, contour lines, and map indicia thereon corresponding to the terrain to be mapped at the same scale as said model, and printing said long distance photograph in registry with the grid lines, contour lines and map indicia of said projection, whereby a phototope is produced comprising a photograph of the terrain together with grid lines, contour lines and map indicia in substantially accurate registry therewith.

4. The method of preparing a photographic map of terrain which consists in making a plurality of aerial photographs of the terrain to be mapped, projecting said photographs upon a block of carvable material in such manner as to produce a plastic image of the terrain on said block, carving said block to coincide with said plastic image so as to produce an accurate relief model of the terrain, projecting at least one of said photographs on said model in registry therewith, taking a photograph of said model with said projected photograph thereon, with camera axis effectively normal to the datum plane of said model using only rays coming to the camera lens which leave the model in a direction normal to the datum plane of said model, or so nearly normal thereto as not to be distinguishable in their photographic effect from normal rays, preparing a line map of said terrain on the same scale as said photograph and superimposing said line map on said photograph so as to provide a photograph of the terrain in registry with said line map.

5. The method of preparing a phototope which consists in preparing a block of carvable material of horizontal layers of material of contrasting character, taking a plurality of aerial photographs of the terrain to be mapped, adjusting the photographs in projecting apparatus and projecting said photographs upon said laminated block in such manner as to produce a plastic image of the terrain on said block, carving said block to coincide with said plastic image so as to produce an accurate relief model of the terrain with the exposed edges of the contrasting layers appearing as contour lines, projecting at least one of said photographs on said block in correct registry therewith, taking a photograph of said block showing the projected photograph and contour lines on said block, with camera axis effectively normal to the datum plane of said model using only rays coming to the camera lens which leave the model in a direction normal to the datum plane of said model, or so nearly normal thereto as not to be distinguishable in their photographic effect from normal rays, preparing a projection containing map indicia pertinent to said terrain, and superimposing said map indicia on said photograph whereby a map is produced containing a photograph of the terrain, contour lines, and map indicia, all in proper registry.

6. The method of preparing a photographic plan of terrain in which the planimetry of the terrain is correctly represented to scale without substantial distortion, which consists in preparing a scale model of the terrain, projecting a photograph of the terrain upon said model in registry therewith, the projection center corresponding with the position of the camera with respect to the terrain at the time the photograph was taken, placing a mirror between the projector and the model so as to overlie a portion of the model at an angle thereto, making a long distance photographic exposure of the image of said model in said mirror, moving said mirror to a position in which it overlies another part of the model and making a photographic exposure of the mirror image of said second part of said model.

7. The method of preparing a photographic representation of terrain from a desired position, which consists in taking a pair of overlapping aerial photographs of said terrain, bringing said photographs into stereoscopic adjustment so as to produce a plastic image of the terrain, projecting said photographs upon a block of formable material having horizontal contrasting laminations, forming said block into an accurate scale model corresponding with the plastic image produced by said projected photographs, projecting at least one of said photographs upon said formed model in registry therewith, and photographing said model with the projection thereon from a selected position different from that from which either of said aerial photographs are projected upon said model.

8. The method of preparing a photographic mosaic of terrain substantially correct in planimetry throughout which consists in preparing scale relief models of adjacent sections of the terrain, projecting a photograph of the terrain corresponding with each scale model upon such model in accurate registry therewith, the projection center corresponding with the position of the camera with respect to the terrain at the time the photograph was taken, taking a long distance photograph of said model with the photograph projected thereon, with camera axis effectively normal to the datum plane of said model, and assembling a series of said long distance photographs in registry so as to form a planimetrically corrected mosaic of the entire terrain to be represented.

9. In apparatus for making a planimetrically corrected photograph of terrain, a support adapted to hold a model of the terrain, a projector, means for mounting said projector in position to project a photograph upon a model upon said support in registry therewith, and an optical system including a mirror mounted in a position to reflect an image of such model with the photograph projected thereon, and a camera arranged to take a picture of such image, the length of the optical path from the model to the camera being much greater than the length of the optical path from the model to the projector.

10. In apparatus for making a planimetrically corrected photograph of terrain, a support adapted to hold a model of the terrain, a projector, means for mounting said projector in position to project a photograph upon a model on said support in registry therewith, a mirror support arranged at an angle between said projector and said model support, a mirror mounted to slide on said mirror support in a horizontal direction in its own plane, a camera arranged to photograph an image in said mirror of a model mounted on said model support, and means for sectionally exposing a plate mounted in said camera, the optical distance from said camera to a model mounted on the model support being much greater than the optical distance from said projector to such model.

11. In apparatus for making a planimetrically corrected photograph of terrain, a support adapted to hold a model of the terrain, a projector, means for mounting said projector in position to project a photograph upon and in registry with, a model on said support, a mirror support arranged at an angle between said projector and said model support, a mirror mounted to slide on said mirror support in a horizontal direction in its own plane, a camera arranged to photograph an image in said mirror of such model, an adjustable screen arranged to sectionally expose a plate mounted in the camera, the optical distance from said camera to a model mounted on the model support being much greater than the optical distance from said projector to such model.

12. The apparatus as claimed in claim 11 in which the adjustable screen is mounted to rotate through an angle of 180° about the axis of the camera lens, the edge of the screen intersecting such axis in each of the 180° positions of the screen.

13. An apparatus for making a planimetrically corrected plane photograph of terrain including a plurality of projectors for projecting photographs of the terrain taken from different positions, adjustable supports for said projectors for supporting them in position to jointly project a plastic image of the terrain, a support adapted to hold a model of the terrain in registry with the plastic image cast by said projectors, and an optical system including a camera for taking a picture of a model on said support with at least one of the photographs in said projectors projected on the model, the camera axis being effectively normal to the datum plane of the model, said optical system and camera being constructed to transmit to a photo-sensitized surface in the camera only rays leaving the model in a direction normal to the datum plane of said model or so nearly normal thereto as not to be distinguishable in their photographic effect from normal rays.

14. An apparatus as defined in claim 13 in which the length of the optical path from the model to the camera is many times the length of the optical path from the model to the projector.

15. An apparatus as defined in claim 13 in which the camera is provided with means for sectionally exposing a plate or film mounted therein.

16. The method of preparing a photographic plan of terrain in which the planimetry of the terrain is correctly represented to scale without substantial distortion, which consists in preparing a scale model of the terrain, projecting a photograph of the terrain upon said model in registry therewith, the projection center corresponding with the position of the camera with respect to the terrain at the time the photograph was taken, and taking a photograph of said model with the projection thereon, with the camera axis effectively normal to the datum plane of said model, using only rays coming to the camera lens which leave the model in a direction normal to the datum plane of said model, or so nearly normal thereto as not to be distinguishable in their photographic effect from normal rays.

17. The method of preparing a photographic plan of terrain in which the planimetry of the terrain is correctly represented to scale without substantial distortion, which consists in preparing a scale model of the terrain, temporarily projecting a photographic image of the terrain upon said model in registry therewith, the projection center corresponding with the position of the camera with respect to the terrain at the time the photograph was taken, and photographing said model with the temporarily projected image thereon with a camera mounted in determinate relationship to the datum plane of said model, using only rays coming from the model to the camera lens which leave the model parallel to the optical axis, extended, of camera or so nearly parallel thereto as not to be distinguishable in their photographic effect therefrom.

18. The method of making a phototope which consists in preparing a scale model of the terrain, temporarily projecting a photograph of the terrain upon said model in registry therewith, the projection center corresponding with the position of the camera with respect to the terrain at the time the photograph was taken, taking a photograph of said model with the projection temporarily thereon with camera axis effectively normal to the datum plane of said model, using only rays coming to the camera lens which leave the model in a direction normal to the datum plane of said model, or so nearly normal thereto as not to be distinguishable in their photographic effect from normal rays, and superimposing upon said photograph a plane topographic representation of the terrain covered by said photograph on the same scale as said photograph and in registry therewith.

19. In a method of making contour maps the steps which consist in preparing a scale model of the terrain having contour lines on its surface at determinate elevations above the datum plane of the model and taking a photograph of said contour lines on a flat surface with camera axis effectively normal to the datum plane of said model, using only rays coming to the camera lens which leave the model in a direction normal to the datum plane of the model, or so nearly normal thereto as not to be distinguishable in their photographic effect from normal rays, whereby the contour lines on said model will be reproduced in said photograph in substantially true orthogonal projection.

20. The method of preparing a photographic plan of terrain in which the planimetry is correctly represented to scale without substantial distortion which consists in preparing a scale model of the terrain, temporarily projecting a photograph of the terrain upon said model in registry therewith, the projection center corresponding with the position of the camera with respect to the terrain at the time the photograph was taken, placing a mirror in position to reflect an image of said model with the photograph temporarily projected thereon at an angle to the direction from which said photograph is projected, and taking a photograph of said image in said mirror with camera axis effectively normal to the datum plane of said model using only rays coming from the camera lens which leave the model in a direction normal to the datum plane of said model, or so nearly normal thereto as not to be distinguishable in their photographic effect from normal rays.

21. The method of making a photographic representation of terrain as viewed from any desired position, which consists in preparing an accurate scale model of the terrain, projecting an aerial photograph of the terrain upon and in registry with the model, the projection center corresponding with the position of the camera with respect to the terrain at the time the photograph was taken and photographing the model with the projection thereon from a selected position different from that corresponding to the position from which the aerial photograph of the terrain was made.

22. The method of making a photographic representation of terrain as viewed from any desired position, which consists in preparing an accurate scale model of the terrain having contour and grid lines thereon, projecting an aerial photograph of the terrain upon and in registry with said model, the projection center corresponding with the position of the camera with respect to the terrain at the time the photograph was taken, and photographing said model with the projection thereon from a selected position different from that corresponding to the position from which the aerial photograph was taken, in such manner as to produce a plane photograph showing the detail of the original aerial photograph together with contour and grid lines as viewed from a position different from that from which the original aerial photograph was taken.

23. The method of preparing a photographic representation of terrain as viewed from a desired position, which consists in projecting a pair of aerial photographs of the terrain to be represented upon a block of formable material in such manner as to produce a plastic image of the terrain on said block, forming the surface of said block to coincide with said plastic image so as to produce an accurate relief model of the terrain, projecting at least one of said photographs on said model in registry therewith, and photographing said model with the projection thereon from a selected position different from that corresponding to either of the positions from which the aerial photographs of the terrain were made.

24. The method of preparing a photographic mosaic of terrain substantially correct in planimetry throughout which consists in preparing scale relief models of adjacent sections of the terrain, projecting a photograph of the terrain corresponding with each scale model upon such model in accurate registry therewith, the projection center corresponding with the position of the camera with respect to the terrain at the time the photograph was taken, taking an orthogonal photograph of each model with the photograph projected thereon with camera axis effectively normal to the datum plane of said model, using only rays coming from the camera lens which leave the model in a direction normal to the datum plane of said model, or so nearly normal thereto as not to be distinguishable in their photographic effect from normal rays, and assembling a series of said orthogonal photographs in registry so as to form a planimetrically corrected mosaic of the entire terrain to be represented.

HEREWARD LESTER COOKE.